(12) United States Patent
Hull (10) Patent No.: US 9,370,209 B2
(45) Date of Patent: Jun. 21, 2016

(54) METHOD OF FABRICATING A GLOVE WITH A WIDENED CUFF AREA

(71) Applicant: Summit Glove Inc., Minerva, OH (US)

(72) Inventor: James L. Hull, Malvern, OH (US)

(73) Assignee: Summit Glove Inc., Minerva, OH (US)

( * ) Notice: Subject to any disclaimer, the term of this patent is extended or adjusted under 35 U.S.C. 154(b) by 56 days.

(21) Appl. No.: 14/490,951

(22) Filed: Sep. 19, 2014

(65) Prior Publication Data

US 2016/0081408 A1    Mar. 24, 2016

(51) Int. Cl.
*A41D 19/00* (2006.01)
*A41D 19/04* (2006.01)
*B29D 99/00* (2010.01)
B29K 33/18 (2006.01)

(52) U.S. Cl.
CPC ........ *A41D 19/0044* (2013.01); *A41D 19/0003* (2013.01); *A41D 19/04* (2013.01); *B29D 99/0067* (2013.01); *B29K 2033/18* (2013.01)

(58) Field of Classification Search
CPC ... A41D 19/00; A41D 19/0044; A41D 20/00; A41D 13/08; A61B 19/04
USPC ............ 2/159, 161.7, 162, 16, 168, 169, 170, 2/203
See application file for complete search history.

(56) References Cited

U.S. PATENT DOCUMENTS

| | | | |
|---|---|---|---|
| 1,571,860 A * | 2/1926 | Meyer | A41D 19/01529 2/164 |
| 1,983,963 A | 12/1934 | Belton et al. | |
| 2,075,550 A | 3/1937 | Smith | |
| 2,117,417 A * | 5/1938 | Hall | A41D 19/0062 2/168 |
| 2,299,855 A * | 10/1942 | Smith | H02G 1/02 2/162 |
| D169,047 S | 3/1953 | Sebrell | |
| 2,821,718 A * | 2/1958 | Hall | A41D 19/0062 2/162 |
| D188,835 S | 9/1960 | Hoffstein | |
| D191,494 S | 10/1961 | Hoffstein | |
| D200,756 S | 4/1965 | Rowley | |
| 3,197,786 A | 8/1965 | Velonis et al. | |
| D202,329 S | 9/1965 | Swistel | |
| D205,925 S | 10/1966 | Whitcraft | |
| D235,175 S | 5/1975 | Berger | |
| 3,942,193 A | 3/1976 | Pugh | |
| 4,047,251 A | 9/1977 | Stockum | |

(Continued)

OTHER PUBLICATIONS

Salisbury Insulating Rubber Gloves (via LTL Utility Supply), available Nov. 19, 2013, [online], [site visited Sep. 23, 2015]. Available from internet, <URL: http://ltlutilitysupply.com/featured-products/salisbury-by-honeywell-insulating-rubber-gloves.

(Continued)

*Primary Examiner* — Tejash Patel
(74) *Attorney, Agent, or Firm* — Sand & Sebolt (57) ABSTRACT

An ambidextrous or hand specific glove with a widened cuff area to aid in donning or doffing the glove is disclosed, together with a former for fabricating the glove and a method of fabricating the same. The glove may further include a bead on the cuff to resist tearing when the glove is put on or taken off. The glove may be fabricated on a continuous, automated chain machine or a batch or semi-batch machine. While the cuff region on the former for fabricating the glove is elliptical in cross-section and is flared, the region of the former on which the end of the glove is fabricated is circular in cross-section and thus allows the beading process to be successfully undertaken.

20 Claims, 11 Drawing Sheets

(56) References Cited

U.S. PATENT DOCUMENTS

| | | | |
|---|---|---|---|
| D253,920 S | 1/1980 | Heavner, Jr. et al. | |
| 4,399,567 A * | 8/1983 | Weon Joong | A41D 19/0082 2/16 |
| 4,536,890 A | 8/1985 | Barnett et al. | |
| 4,696,065 A | 9/1987 | Elenteny | |
| 4,809,365 A * | 3/1989 | Chen | A41D 19/0062 2/162 |
| 4,921,672 A * | 5/1990 | Bock | B29C 45/2701 2/169 |
| D310,133 S | 8/1990 | Chen et al. | |
| 5,579,539 A | 12/1996 | Flick | |
| 5,649,326 A | 7/1997 | Richard, Jr. et al. | |
| 5,685,014 A | 11/1997 | Dapsalmon | |
| 5,792,531 A | 8/1998 | Littleton et al. | |
| 5,953,756 A * | 9/1999 | Vrissimdjis | A41D 19/0058 2/16 |
| 6,249,917 B1 | 6/2001 | Vrissimdjis et al. | |
| D528,703 S | 9/2006 | Smedi | |
| 7,448,091 B2 | 11/2008 | Kruss | |
| D602,207 S | 10/2009 | Hull | |
| D612,996 S | 3/2010 | Kishihara et al. | |
| D612,998 S | 3/2010 | Kishihara et al. | |
| 7,721,354 B2 * | 5/2010 | Yu | A41D 19/0089 2/167 |
| 8,028,348 B2 | 10/2011 | Hull | |
| 8,146,174 B2 | 4/2012 | Knuth et al. | |
| 8,286,264 B2 | 10/2012 | Hull | |
| 8,302,216 B2 | 11/2012 | Hull | |
| 8,495,764 B2 | 7/2013 | Hull | |
| 8,856,967 B2 | 10/2014 | Govindasamy et al. | |
| D735,968 S | 8/2015 | Furlong | |
| 2001/0018095 A1 | 8/2001 | Shlenker et al. | |
| 2003/0118761 A1 | 6/2003 | Triebes et al. | |
| 2003/0118837 A1 | 6/2003 | Modha et al. | |
| 2003/0221239 A1 | 12/2003 | Modha et al. | |
| 2003/0226191 A1 | 12/2003 | Modha et al. | |
| 2006/0212991 A1 | 9/2006 | Noreen | |
| 2008/0022436 A1 | 1/2008 | Hull | |
| 2010/0257656 A1 | 10/2010 | Hull | |
| 2010/0257657 A1 | 10/2010 | Hamann et al. | |
| 2011/0145967 A1 | 6/2011 | Hull | |
| 2012/0005807 A1 | 1/2012 | Hull | |
| 2012/0036612 A1 | 2/2012 | Hull | |
| 2013/0025024 A1 | 1/2013 | Hull | |
| 2013/0196066 A1 | 8/2013 | Hull | |
| 2013/0298308 A1 | 11/2013 | George | |
| 2014/0259283 A1 | 9/2014 | Govindasamy et al. | |
| 2015/0150322 A1 | 6/2015 | Fraga-Rosenfeld | |

OTHER PUBLICATIONS

Ansell Rubber Electrician Gloves, available Sep. 23, 2015, [online], [site visited Sep. 23, 2015]. Available from internet, <URL: http://industrialcatalogue.ansell.eu/electrician-class-00.

Ansell Class 00 Rubber Lineman's Gloves, available Sep. 23, 2015, [online], [site visited Sep. 23, 2015]. Available from internet, <URL: http://www.mscdirect.com/product/details/42905281.

Salisbury Insulating Rubber Gloves, available Mar. 17, 2015, [online], [site visited Sep. 23, 2015]. Available from internet, <URL: http://legionsafety.com/salisbury-class-0-insulating-rubber-electrical-gloves-html.

Salisbury Insulating Rubber Gloves, available Mar. 17, 2015, [online], [site visited Sep. 23, 2015]. Available from internet, <URL: http://www.legionsafety.com/salisbury-class-00-insulating-rubber-gloves.html.

True Blues Household Gloves, available Feb. 27, 2008, [online], [site visited Sep. 23, 2015]. Available from internet, <URL: http://www.amazon.com/Blues-Extra-Ultimate-Household-Gloves/dp/B002BCCXZ0/ref=pd_sim_121_2?ie=UTF8&refRID=0490XOSSAS84HC4BBCTN.

* cited by examiner

METHOD OF FABRICATING A GLOVE WITH A WIDENED CUFF AREA

BACKGROUND OF THE INVENTION

1. Technical Field

This invention relates generally to gloves. More particularly, this invention relates to dipped unsupported gloves. Specifically, the invention is directed to an ambidextrous or hand specific glove with a widened cuff area to aid in donning or doffing the glove; the glove may further include a bead on the cuff to resist tearing and may be fabricated on a continuous, automated chain machine or a batch or semi-batch machine because while the cuff region on the former for the glove is elliptical in cross-section and flared, the region of the former on which the end of the glove is fabricated is circular in cross-section and thus allows the beading process to be successfully undertaken.

2. Background Information

Gloves are required to be worn in many industries to protect the hands of the workers. Particular industries require gloves which are made of nitrile, polychloroprene, or latex and which extend for a distance along a worker's wrist and forearm. Because of the length of the glove and the material from which the glove is fabricated, which tends to conform to the shape of the workman's hands, it can be quite difficult for a workman to put the glove on and/or take the glove off without damaging the glove.

SUMMARY

There is therefore a need in the industry for an improved glove which is more readily able to be put on and removed, and which is less inclined to break or become damaged during this procedure.

In one aspect, the invention may provide a glove comprising a palm region; a digit region extending outwardly from a first end of the palm region; a wrist region extending outwardly from a second end of the palm region and generally in an opposite direction to the digit region; and an end of the wrist region comprising a cuff that is disposed a distance remote from the palm region; and wherein the wrist region gradually increases in width from a first width proximate the palm region to a second width proximate the cuff.

In another aspect, the invention may provide a glove comprising:

a palm region; a digit region extending outwardly from a first end of the palm region; a wrist region extending outwardly from a second end of the palm region and generally in an opposite direction to the digit region; and a bead provided at an end of the wrist region, wherein the bead is of a greater thickness than the rest of the wrist region; and wherein the glove is a hand specific glove that is fabricated on a substantially continuous automated chain machine.

In another aspect, the invention may provide a glove comprising a palm region; a digit region extending outwardly from a first end of the palm region; a wrist region extending outwardly from a second end of the palm region and generally in an opposite direction to the digit region; an end of the wrist region comprising a cuff that is disposed a distance remote from the palm region; and wherein the wrist region gradually increases in width from a first width proximate the palm region to a second width proximate the cuff; and a bead provided on the cuff, wherein the bead is of a greater thickness than the rest of the wrist region. This glove may be an ambidextrous glove or a hand-specific glove.

In another aspect, the invention may provide a former for fabricating a glove, wherein the former comprises a base; a wrist extending outwardly from the base; a palm extending outwardly from the wrist; a digit region extending outwardly from the palm and remote from the wrist; and wherein the wrist includes a first region that is of a first cross-sectional shape and a second region that is of a second cross-sectional shape. The first region of the former is generally elliptical in cross-sectional shape and the second region of the former is generally circular in cross-sectional shape.

In another aspect, the invention may provide a method of fabricating a glove comprising providing a former that includes a palm, a thumb and four digit regions extending outwardly from the palm in a first direction, and a wrist that extends outwardly from the palm in a second direction; and wherein the wrist includes a first region that gradually increases in width from the palm outwardly in the second direction; dipping the former into a vat of liquid material; removing the former from the liquid material; drying a quantity of liquid material which remains on the former so as to form the glove; and removing the glove from the former. The method may further include providing a former where the wrist further includes a second section which extends outwardly from the first section; and wherein the second section is of a constant width and the constant width of the second section is of a size equal to a widest portion of the first section. Still further, the invention may provide that the first section is generally elliptical in cross-sectional shape and the second region is generally circular in cross-sectional shape.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

DETAILED DESCRIPTION

Figure 1:
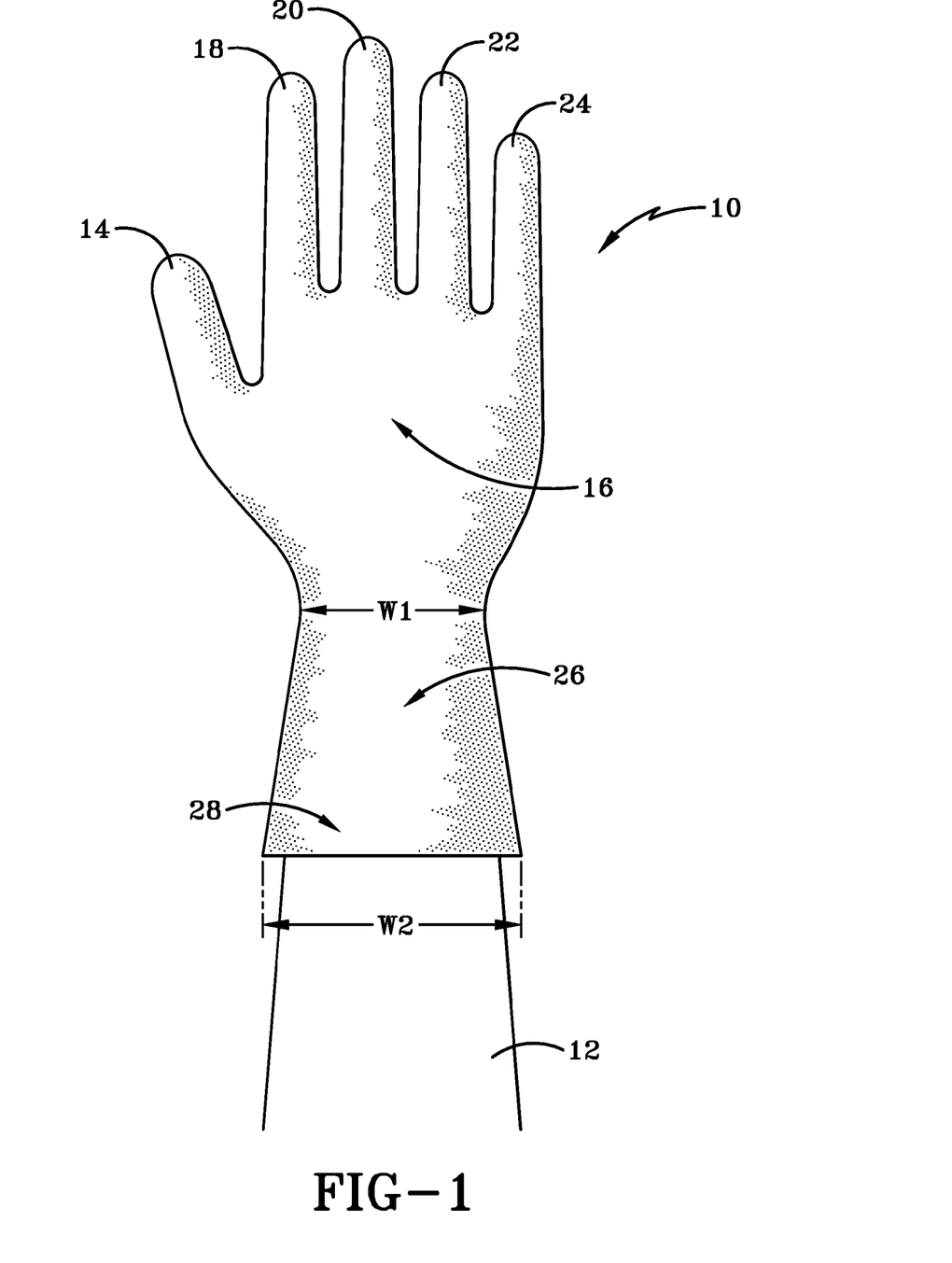
FIG. 1 is a front elevational view of a first embodiment of a glove in accordance with an aspect of the invention.

FIG. 1 shows a glove 10 worn on an arm 12 of a workman. Glove 10 may be fabricated from nitrile or latex or any other material which causes glove 10 to generally conform to a hand of a person wearing glove. Glove 10 includes a digit region extending out from a first end of a palm region 16 generally in a first direction. The digit region includes a thumb region 14, an index finger region 18, a middle finger region 20, a ring finger region 22, and a little finger region 24. Glove 10 is an ambidextrous glove. This means that glove 10 may be readily worn on either of the left hand or the right hand. Because glove 10 is an ambidextrous glove, thumb region 14, index finger region 18, middle finger region 20, ring finger region 22, and little finger region 24 are all aligned along a common axis. In other words, if glove 10 is viewed from the side, all of the thumb region 14, index finger, middle finger, ring finger, and little finger regions 18, 20, 22, 24 will be located in the same plane.

A wrist and forearm region 26 (hereafter referred to as the wrist region) extends outwardly from a second end of palm region 16 and in generally the opposite direction to the digit region. Wrist region 26 terminates in an end region which will be further referred to herein as a cuff 28. Cuff 28 is disposed a distance remote from palm region 14. Although not illustrated herein, it will be understood that cuff 28 defines an opening into which the workman will be able to insert his or her hand. It will further be understood that wrist region 26 may be of a variety of different lengths as measured between a bottom end of palm region 16 and cuff. Thus, glove 10 may terminate closer to a workman's wrist or closer to the workman's elbow.

Wrist region 26 includes a first section that is located adjacent palm region 16 and a second section that extends outwardly from first section and is located further away from palm region 16. The second section includes cuff 28. Wrist region 26 gradually increases in width as one moves away from palm region 16 and toward cuff 28. Proximate palm region 16, wrist region 26 is of a first width "W1" and wrist region 26 gradually increases to a second width "W2". Thus, wrist region 26 is narrowest proximate palm region 14 and is widest a distance remote therefrom. Wrist region 26 may include a first section which gradually increases in width to the widest width "W2", and a second section which extends outwardly from the first section and is of a constant width "W2". This increase in width makes it easier for the workman to put glove 10 on and to take glove 10 off. Width "W1" is of such a size that the first section of wrist region 16 is generally in abutting contact with the wearer's wrist and first portion of the wearer's forearm. Width "W2" is of such as a size that second section of wrist region 16 is spaced a distance away from the wearer's forearm 12 and is generally free of contact therewith. Consequently, a gap 27 will be created between the wearer's forearm 12 and the material of the glove 10. It is therefore easier for the wearer to insert a finger or thumb of the other hand into that gap 27 in order to grasp the material of glove 10 in order to pull glove 10 onto their hand or to pull glove off of their hand.

Figure 2:
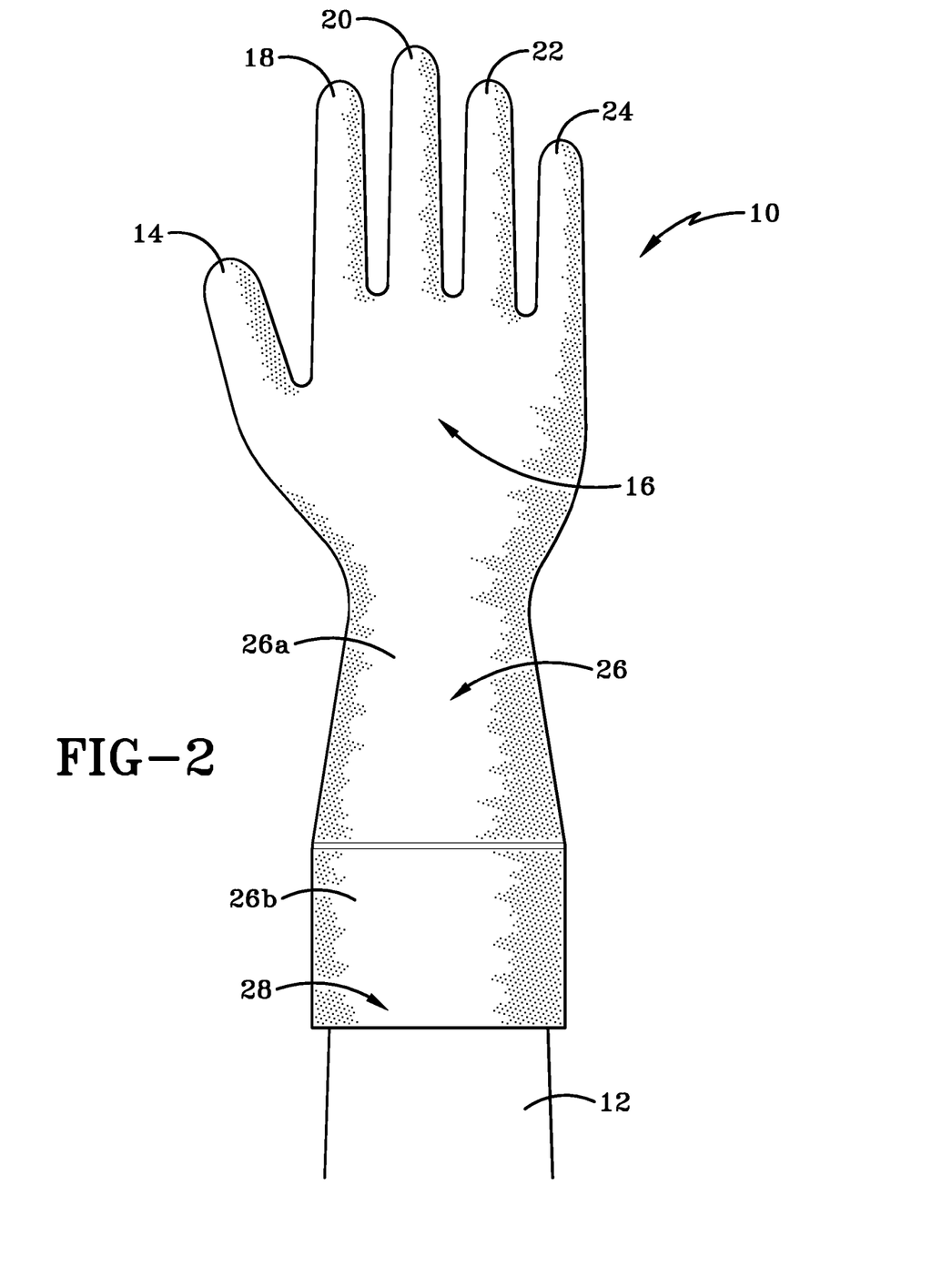
FIG. 2 is a front elevational view of a second embodiment of a glove in accordance with an aspect of the invention.

FIG. 1 shows that wrist region 26 gradually increases in width from proximate palm region 14 to proximate cuff 28. So, the width of cuff 28 is the second width "W2". FIG. 2 shows a second embodiment of the ambidextrous glove 10 where the first section of wrist region 26 gradually increases in width from the first width "W1" to the second width "W2". Second section of wrist region 26 starts where wrist region is of the second width "W2" and the second section terminates at cuff 28. However, from where wrist region 26 initially reaches the second width "W2" to the point where wrist region 26 terminates in cuff 28, the second section of wrist region 26 is of a substantially constant width, namely second width "W2".

Figure 3:
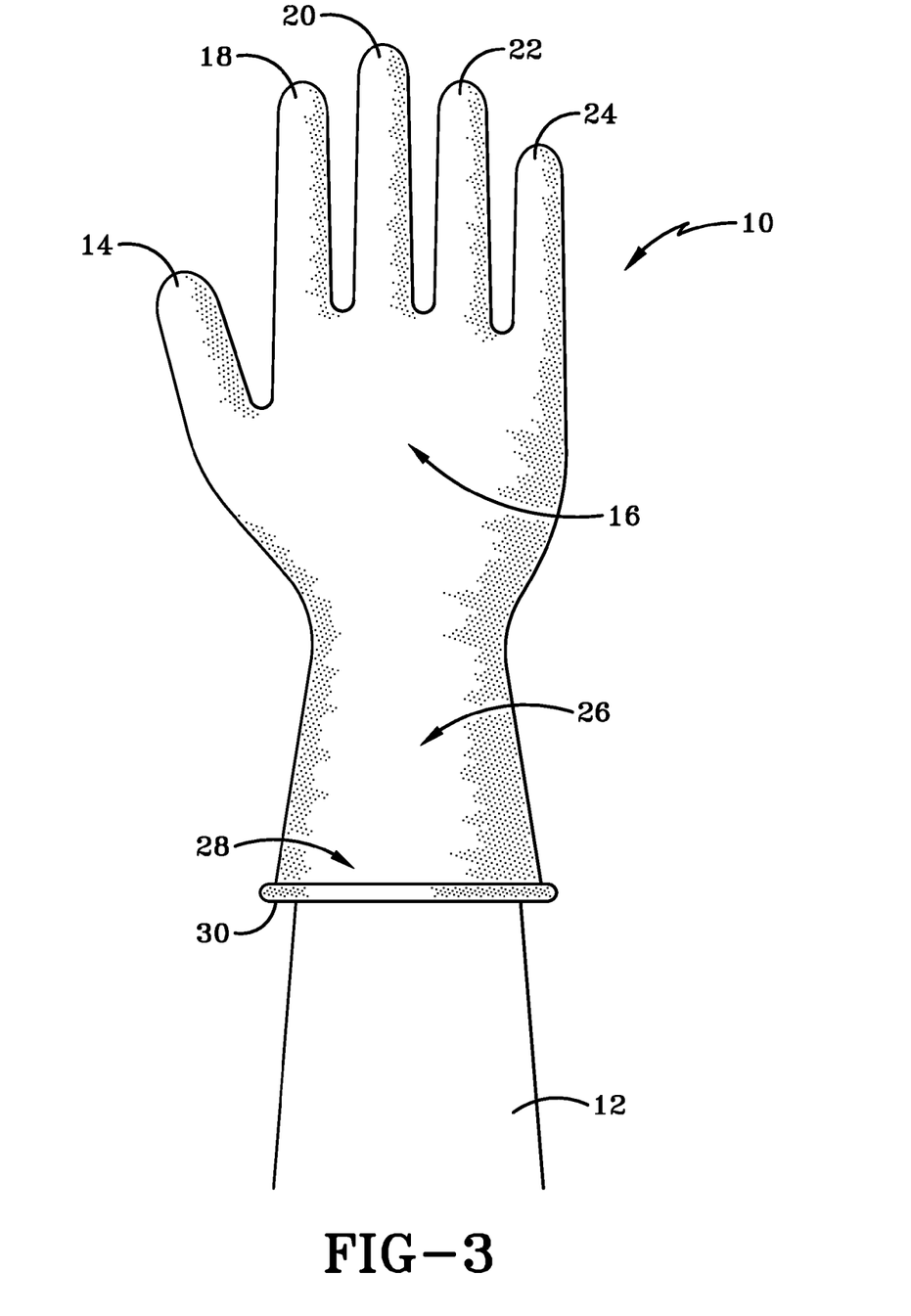
FIG. 3 is a front elevational view of a third embodiment of a glove in accordance with an aspect of the invention.

FIG. 3 illustrates a third embodiment of the ambidextrous glove 10. In this embodiment, the second section of the wrist region 26 of glove 10 is rolled to form a bead 30. Bead 30 extends around the entire rim of cuff 28 and comprises a rolled and therefore thickened region which serves to strengthen cuff 28. Bead 30 is thicker than the rest of wrist section and this thicker and stronger bead 30 aids in resisting tears in cuff 28 and therefore wrist region 26 as glove 10 is pulled on or taken off.

In each of the first, second, and third embodiments of the glove 10, at least a portion of glove 10 will conform to the hand of the wearer. The portions of the glove 10 which will tend to conform to the hand of the wearer may include the thumb region 14, index finger region 18, middle finger region 20, ring finger region 22, little finger region 24, palm region 16, and at least part of the first section of wrist region 26. In these aforementioned locations, an interior surface of glove 10 will abut or be positioned adjacent the wearer's skin. The rest of glove 10, namely the parts of first section of wrist region 26 which are of a width that is greater than the wrist or forearm 12 of the wearer, will be spaced a distance away from the wearer's skin.

Figure 4:
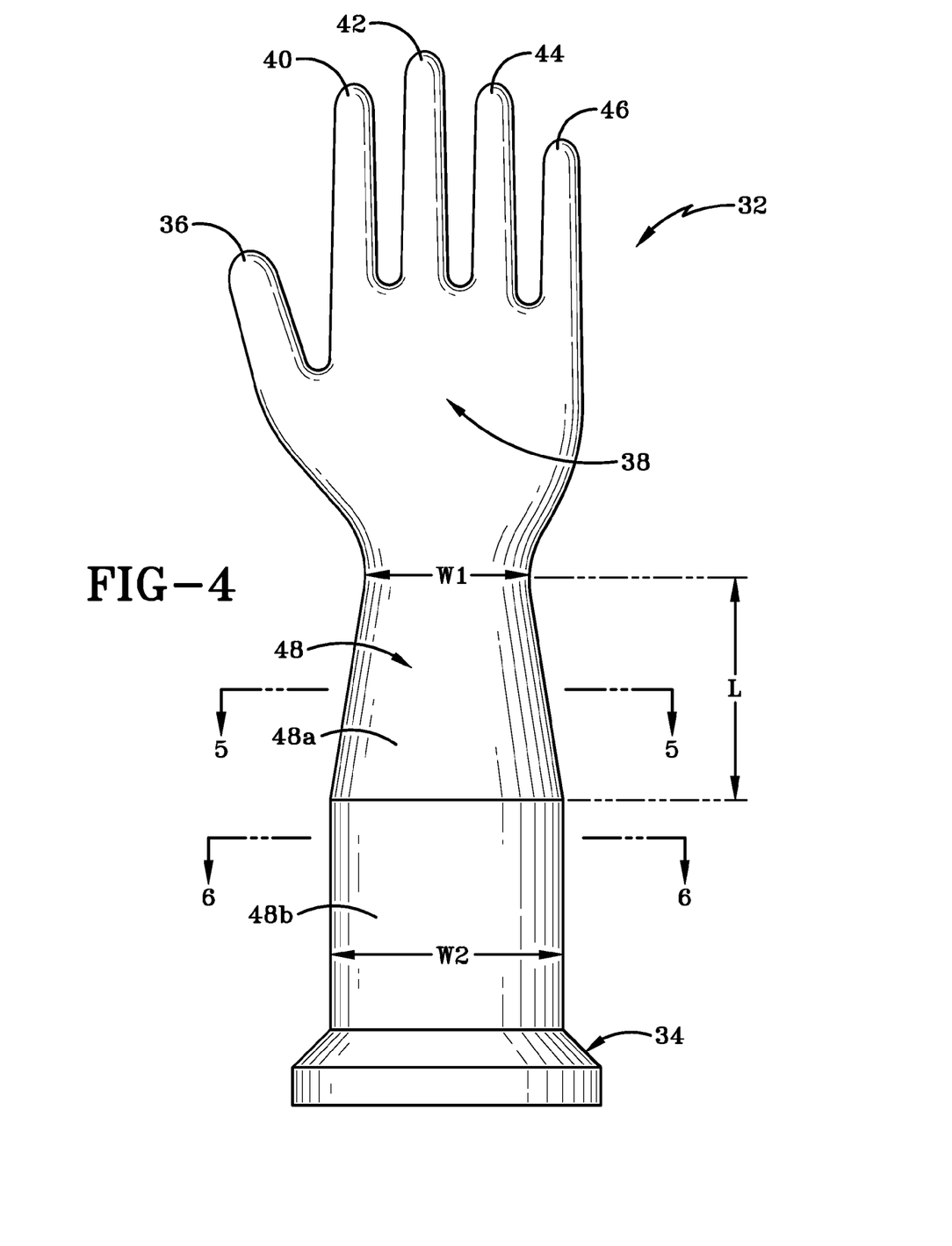
FIG. 4 is a front elevational view of a former for fabricating the gloves of FIGS. 1, 2, and 3.

FIG. 4 shows a former 32 used for fabricating glove 10. Former 32 includes a base 34 which is secured in any one of a known manner to a batch machine, a semi-batch machine or a substantially continuous automated chain machine that is used for fabricating gloves. The batch machine, semi-batch machine and the automated chain machine are well known in the art and therefore will not be described further herein.

Former 32 includes a thumb 36 and four digits which extend outwardly from a palm 38. The digits include an index finger 40, a middle finger 42, a ring finger 44, and a little finger 46. A wrist and forearm (hereafter wrist) 48 extend between palm 38 and the base 34. Since former 32 is utilized for fabricating ambidextrous gloves, such as glove 10, thumb 36 and the index, middle, ring and little fingers 40, 42, 44, and 46 are all positioned so that they are aligned along a common axis. In other words, if viewed from the side, all of the thumb 36, the index, middle, ring, and little fingers 40, 42, 44, 46 will be located in the same plane.

Wrist 48 includes a first section 48a that increases in width from a width "W1" to a width "W2". The narrower width "W1" is provided adjacent palm 38 and the wrist 48 increases in width to width "W2" some distance from palm 38. That distance "L" may be varied in accordance with the overall length of glove 10 to be fabricated on former 32. So length "L" will be smaller if glove 10 will terminate proximate the workman's wrist and will be substantially longer if glove 10 is to terminate proximate the workman's elbow.

Figure 5:
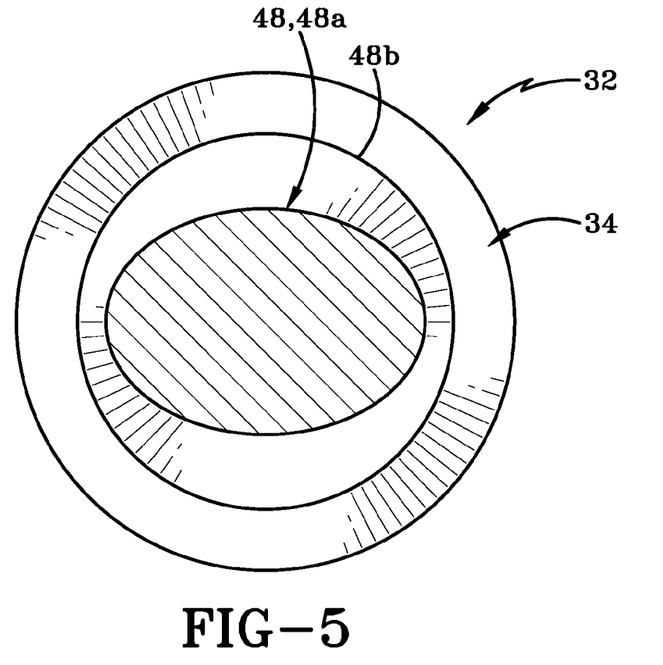
FIG. 5 is a cross-section of the former taken along line 5-5 of FIG. 4.

Wrist 48 further includes a second section 48b that extends outwardly from one end of first section 48a and is of a constant width. That constant width is of the same magnitude as the widest portion of first section 48a. The width of second section 48b is therefore "W2". First and second regions 48a, 48b are different in another way and this can best be seen in FIGS. 5 and 6. First section 48a is generally elliptical (FIG. 5) in cross-sectional shape while second section 48b is generally circular (FIG. 6) in cross-sectional shape. This difference in cross-sectional shape makes it possible for former 32 to be engaged on a substantially continuous automated chain machine so that bead 30 may be readily and easily fabricated.

Previously known formers have wrists which are generally elliptical in shape along their entire length from the palm of the former to the base thereof. Thus, when gloves are fabricated on the previously known formers, it is difficult to generate a bead on the glove cuff because the elliptical shape causes the material of the glove to flap around and roll unevenly. This made it difficult for manufacturers using previously known formers to create a consistent product and, consequently, automated chain machines or batch machines could not be used to fabricate gloves which include a rolled cuff.

Figure 6:
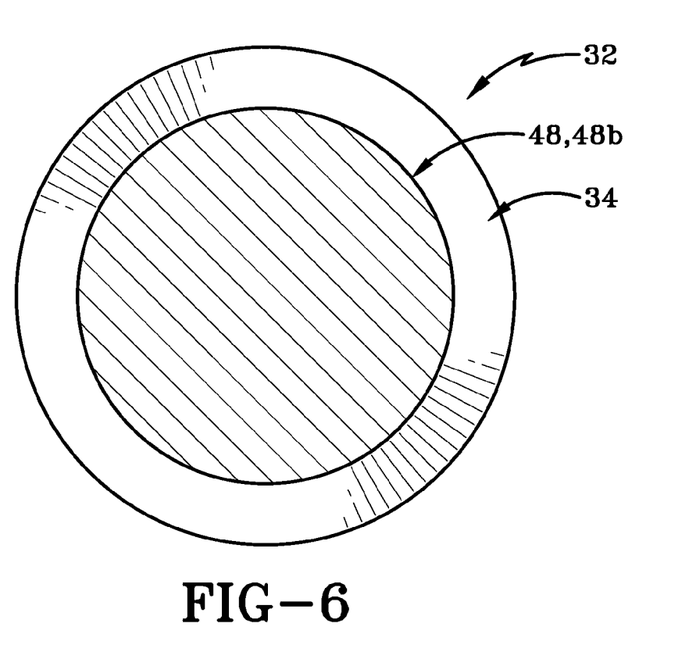
FIG. 6 is a cross-section of the former taken along line 6-6 of FIG. 4.

It has been recognized by the inventor that fabricating a former 32 to include a second section 48b which is not of an elliptical cross-sectional shape but is instead of a circular cross-sectional shape, such as is illustrated in FIG. 6, makes it possible for the former 32 to be utilized in a substantially continuous automated chain machine or a batch machine or a semi-batch machine, in order to fabricate gloves 10, particularly gloves with a bead 30 on cuff 28.

Figure 6A:
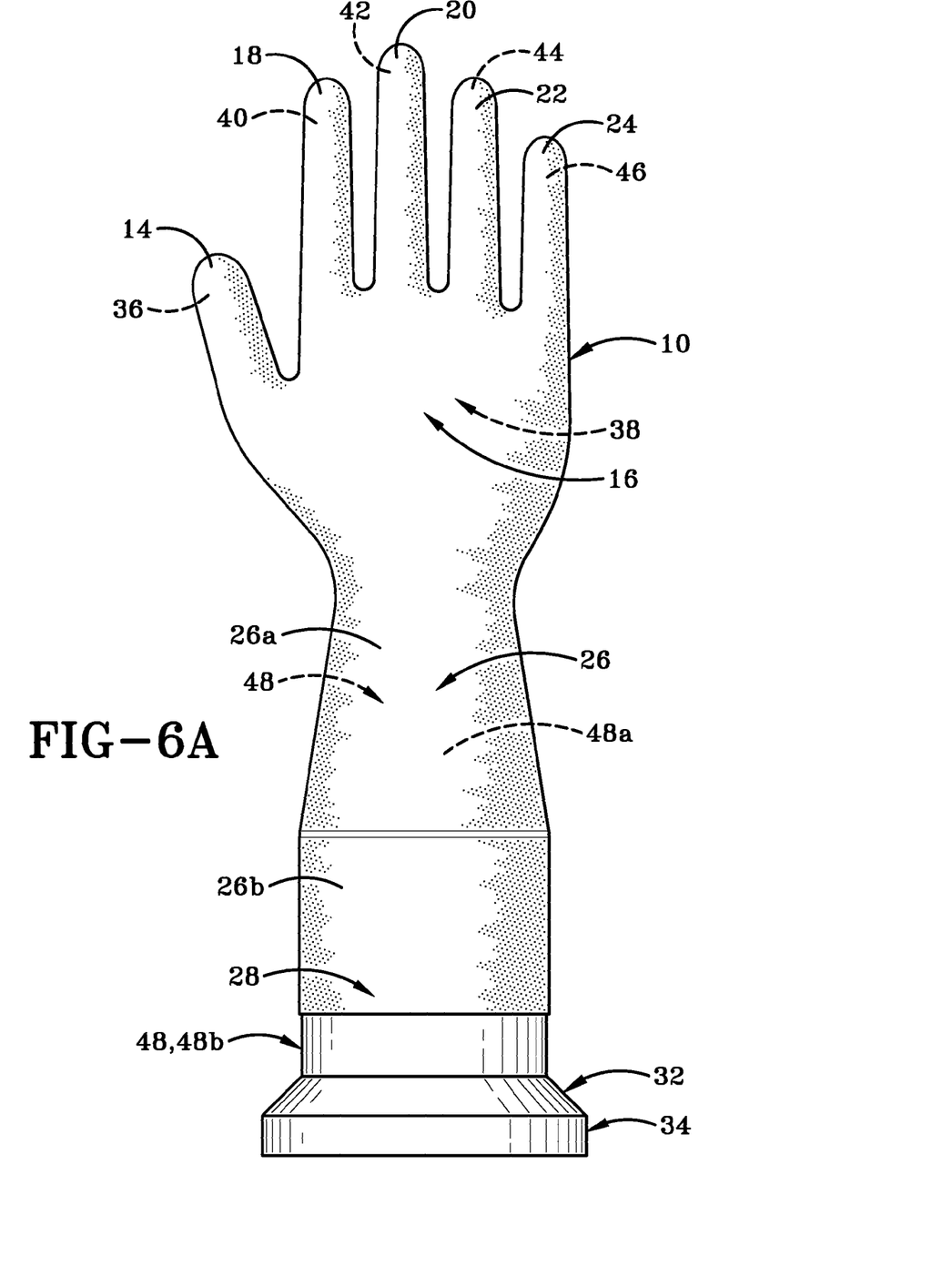
FIG. 6A is a front elevational view of the glove of FIG. 2 shown on the former of FIG. 4 and with the cuff of the glove in an initial position.

During fabrication of glove 10, as illustrated in FIG. 6A, former 32 is dipped into vats of a material such as nitrile or latex so that glove 10 is ultimately formed on former. In the version of glove 10 illustrated in FIG. 6A, wrist region 26 is elongated and includes a first section 26a that progressively widens outwardly from adjacent proximate palm region 16 to a distance remote therefrom. First section 26a is formed on first section 48a of former 32. Wrist region 26 further includes a second section 26b that is of a substantially constant width, with that width being equivalent to the widest part of first section 26a. Second section 26b is formed on second section 48b of former 32. At this point, glove 10 could be removed from former 32 and would be suitable for a workman to use as the cuff 28 and wrist region 26 are widened so that glove 10 is easy to put on and take off.

Figure 6B:
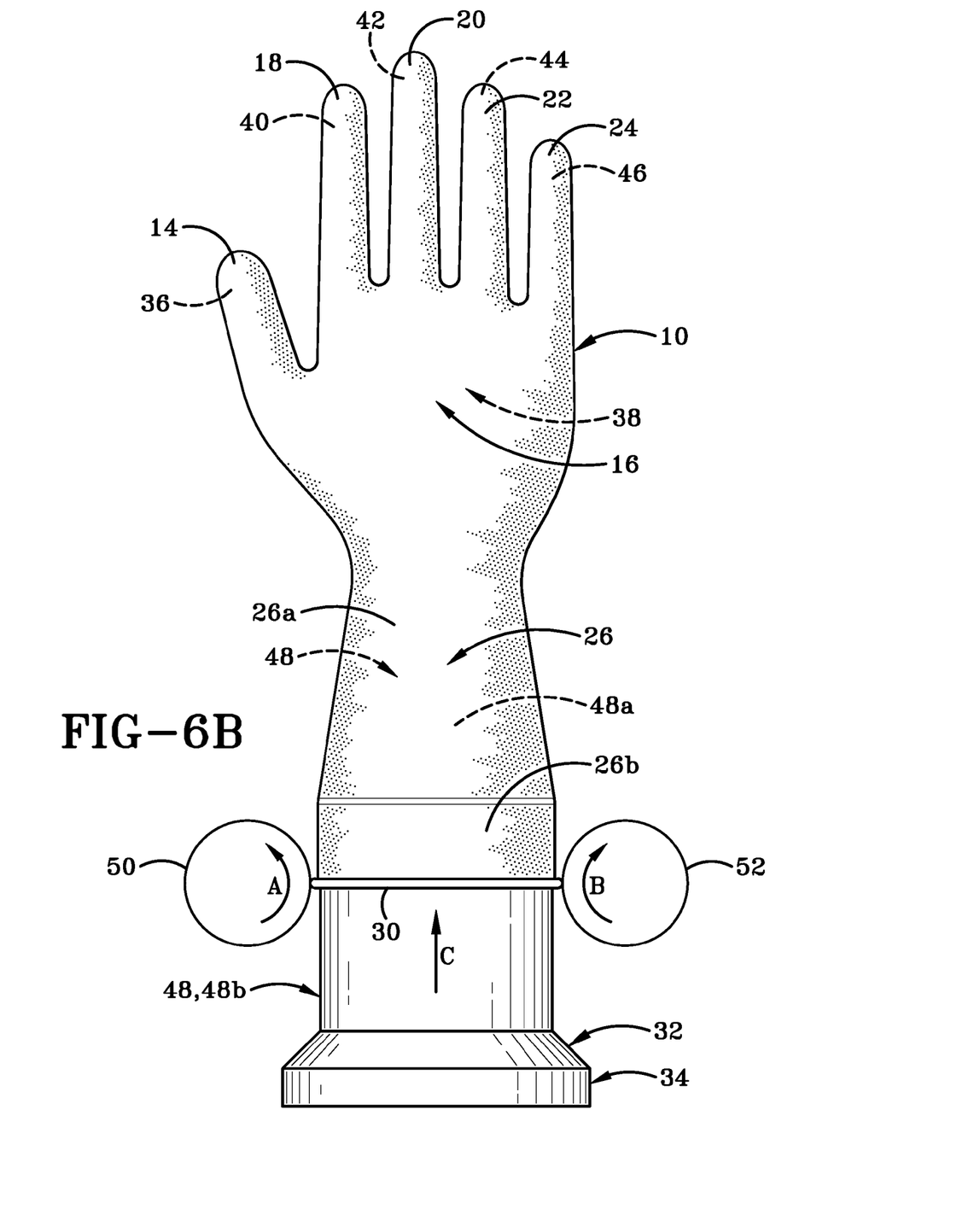
FIG. 6B is a front elevational view of the glove on the former showing the bottom edge of the cuff being rolled upwardly to form the bead.

However, a bead 30 may, instead, be fabricated on second section 26b. FIG. 6B shows how this is done. Former 32 is positioned so that spaced apart opposed rollers 50, 52 are brought into contact with the peripheral wall of second section 48b of wrist region 48 of former 32. Rollers 50, 52 are caused to rotate in opposite directions "A" and "B" relative to each other. Additionally, rollers 50, 52 are moved in a direction "C" away from base 34 or former 32 is moved in the direction "C". Rollers 50, 52 are initially placed in contact with second section 48b of former 32 and then are gradually brought into contact with second section 26b of glove 10. This combination of motion in addition to the contact of rollers 50, 52 with second section 26b causes rollers 50, 52 to roll up a length of the material of second section 26b, thereby gradually forming bead 30.

Figure 7:
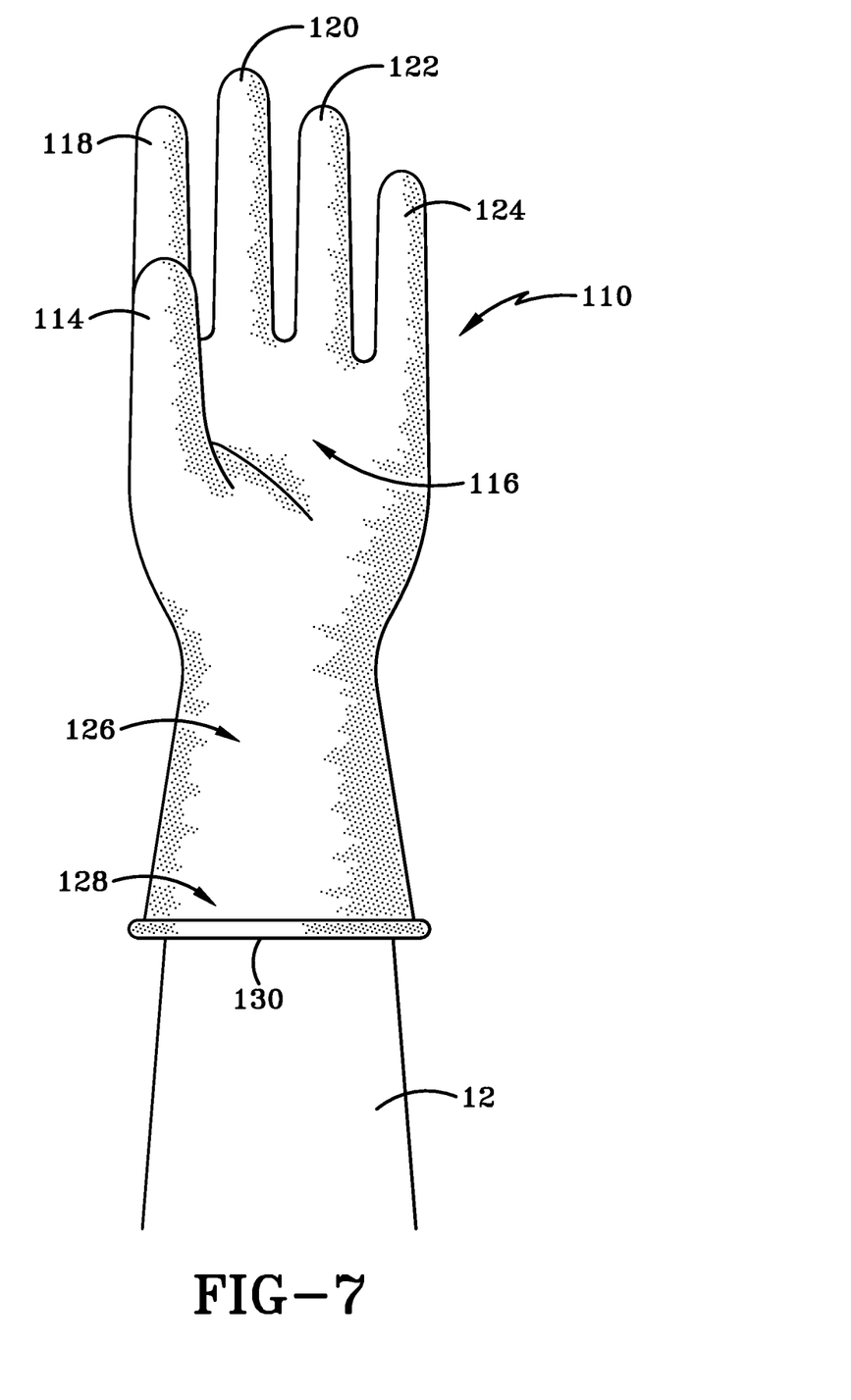
FIG. 7 is a front elevational view of a fourth embodiment of a glove in accordance with an aspect of the present invention.

FIG. 7 shows a fourth embodiment of a glove in accordance with an aspect of the invention. Glove 110 is a hand-specific glove as opposed to ambidextrous glove 10 shown in FIGS. 1 and 2. In particular, glove 110 is shaped to be worn on a workman's left hand. A glove to be worn on the workman's right hand will be a mirror image of glove 110. Glove 110 may be fabricated out of nitrile or latex or any other material which causes glove 10 to generally conform to a hand of a person wearing glove.

Glove 110 includes a digit region which extends outwardly generally in a first direction from a palm region 116. The digit region includes a thumb region 114, an index finger region 118, a middle finger region 120, a ring finger region 122, and a little finger region 124. Because glove 110 is a hand-specific glove, the index finger region 118, middle finger region 120, ring finger region 122, and little finger region 124, are all aligned along a common axis. In other words, when glove 110 is viewed from the side, four of the digits, namely the index finger, middle finger, ring finger, and little finger regions 118, 120, 122, and 124 are all located in the same plane. However, unlike glove 10, the thumb region 114 of glove 110 is offset from that common axis or, when viewed from the side, thumb region 114 can be seen to be located in a different plane from the rest of the digits.

A wrist and forearm region 126 (hereafter referred to as the wrist region) extends outwardly from a second end of palm region 116 in the opposite direction to the digit region. Wrist region 126 terminates in a cuff 128. Although not illustrated herein, it will be understood that cuff 128 defines an opening into which the workman will be able to insert his or her hand. It will further be understood that wrist region 126 may be of a variety of different lengths as measured between a bottom end of palm region 116 and cuff 128. Thus, glove 110 may terminate closer to a workman's wrist or closer to the workman's elbow.

Cuff 128 includes a bead 130. Bead 130 extends around the entire rim of cuff 128 and comprises a rolled and thickened region which strengthens cuff 128. Bead 130 is thicker than the rest of wrist region 126. This thicker and stronger bead 130 aids in resisting tears in cuff 128 as glove 110 is pulled on or taken off. Bead 130 is fabricated in the same manner as bead 30 on glove 10. Thus, the hand-specific glove 110 shown in FIG. 7 may include a bead and be fabricated by a substantially continuous automated chain machine, or a batch machine, or a semi-batch machine as has been described previously herein with reference to glove 10.

In glove 110, thumb region 136, index finger, middle finger, ring finger, and little finger regions 140; 142, 144, 146, palm region 138 and a first section of wrist region 148 adjacent palm region 138 may be designed to conform to the shape of the wearer's hand and wrist. Thus, these regions of glove 110 tend to be in abutting contact with the wearer's hand and wrist. Wrist region 126 may widen as one moves away from palm region 116 and toward cuff 128. Thus, proximate palm region 116, wrist region 126 may be of a first width "W1" and proximate cuff 128, wrist region 126 may be of a second width "W2". Width "W2" is greater than width "W1". Width "W1" may cause the first section of wrist region 126 to come into abutting contact with the skin on wearer's wrist. Width "W2" is greater than the width of the wearer's forearm and, consequently a gap 127 is created between the skin on the wearer's forearm and the interior surface of glove 132. This increase in width or the gap 127 makes it easier for the workman to put glove 110 on and to take glove 110 off.

Figure 8:
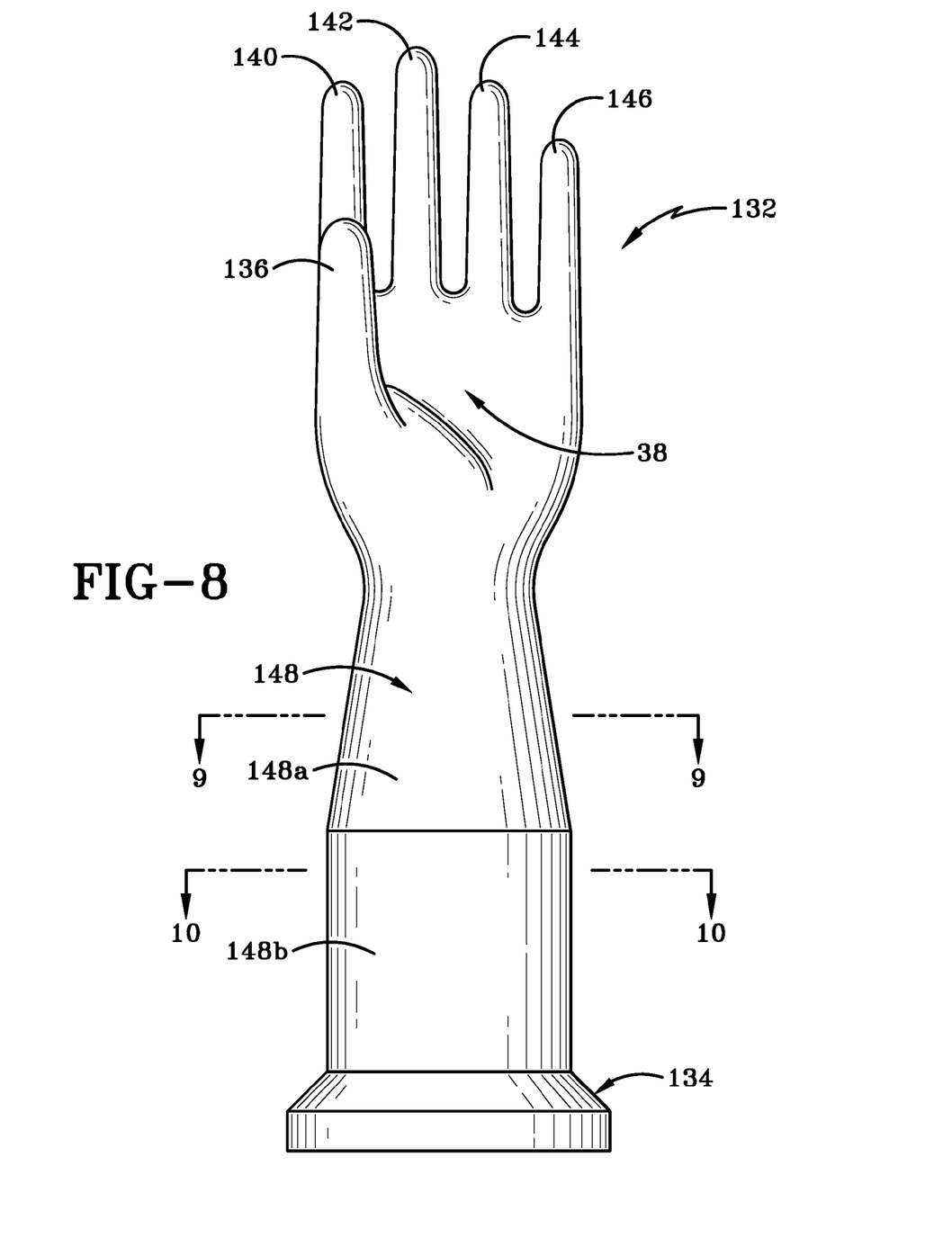
FIG. 8 is a front elevational view of a former for fabricating the glove of FIG. 7.

FIGS. 8, 8A and 8B show a former 132 used for fabricating hand-specific glove 110. Former 132 includes a base 134 which is secured in any one of a known manner to a batch machine, a semi-batch machine or an automated chain machine that is used for fabricating gloves. Former 132 includes a thumb 136 and four digits which extend outwardly from a palm 138. The digits include an index finger 140, a middle finger 142, a ring finger 144, and a little finger 146. A wrist and forearm (hereafter wrist) 148 extend between palm 138 and the base 134. Index finger 140, middle finger 142, ring finger 144 and little finger 146 are all aligned along a common axis or, when viewed from the side, all of these aforementioned components are positioned in the same plane. Thumb region 136 is offset from common axis or, when viewed from the side, thumb region 136 can be seen to be positioned in a different plane relative to the other digits.

Wrist 148 may include a first region 148a that increases in width from a width "W1" to a width "W2". The narrower width "W1" is provided adjacent palm 138 and the wrist 48 increases in width to width "W2" some distance "L" from palm 138. That distance "L" may be varied in accordance with the overall length of glove 110 to be fabricated on former 132. So length "L" will be smaller if glove 110 will terminate proximate the workman's wrist and will be substantially longer if glove 110 is to terminate proximate the workman's elbow.

Figure 9:
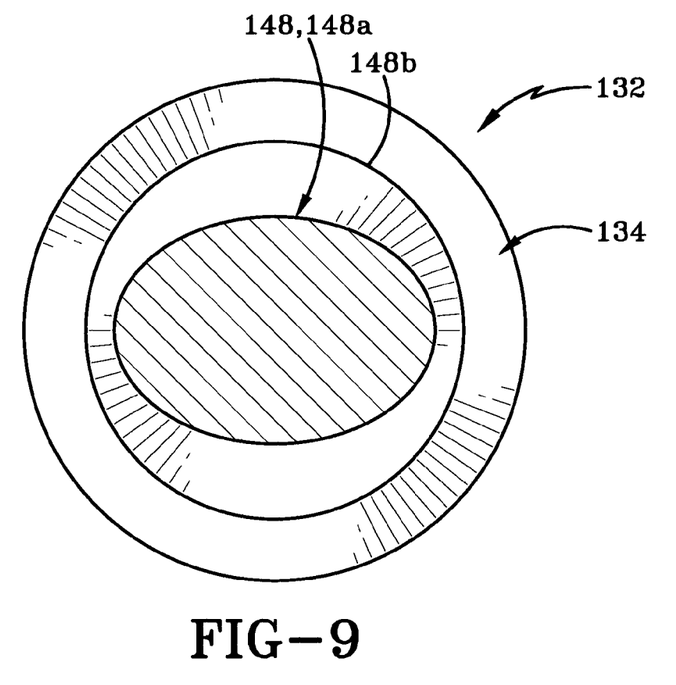
FIG. 9 is a cross-section of the former taken along line 9-9 of FIG. 8.
Figure 10:
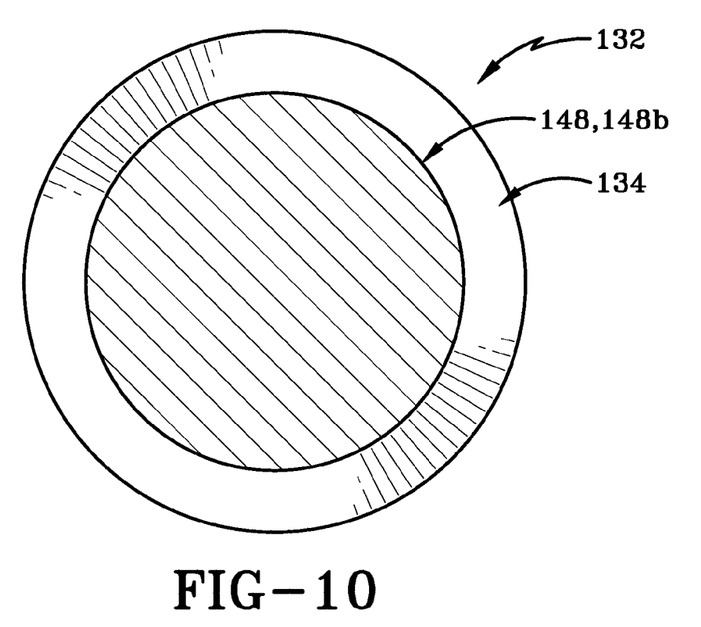
FIG. 10 is a cross-section of the former taken along line 10-10 of FIG. 8.

Wrist 148 may further include a second region 148b that extends outwardly from one end of first region 148a of wrist 148 and is of a constant width. That constant width is of the same size as the widest portion of first region 148a. The width of second region 148b is therefore "W2". First and second regions 148a, 148b are different in another way and this can best be seen in FIGS. 9 and 10. First region 148a is generally elliptical in cross-section shape while second region 148b is generally circular in cross-sectional shape. This difference in shape makes it possible for former 132 to be engaged on a substantially continuous or continuous automated chain machine so that bead 130 may be readily and easily fabricated as has been described above with reference to glove 10. In particular, it is the second region 148b of wrist 148 that is contacted by appropriate machinery and is rolled to form bead 130.

Figure 11:
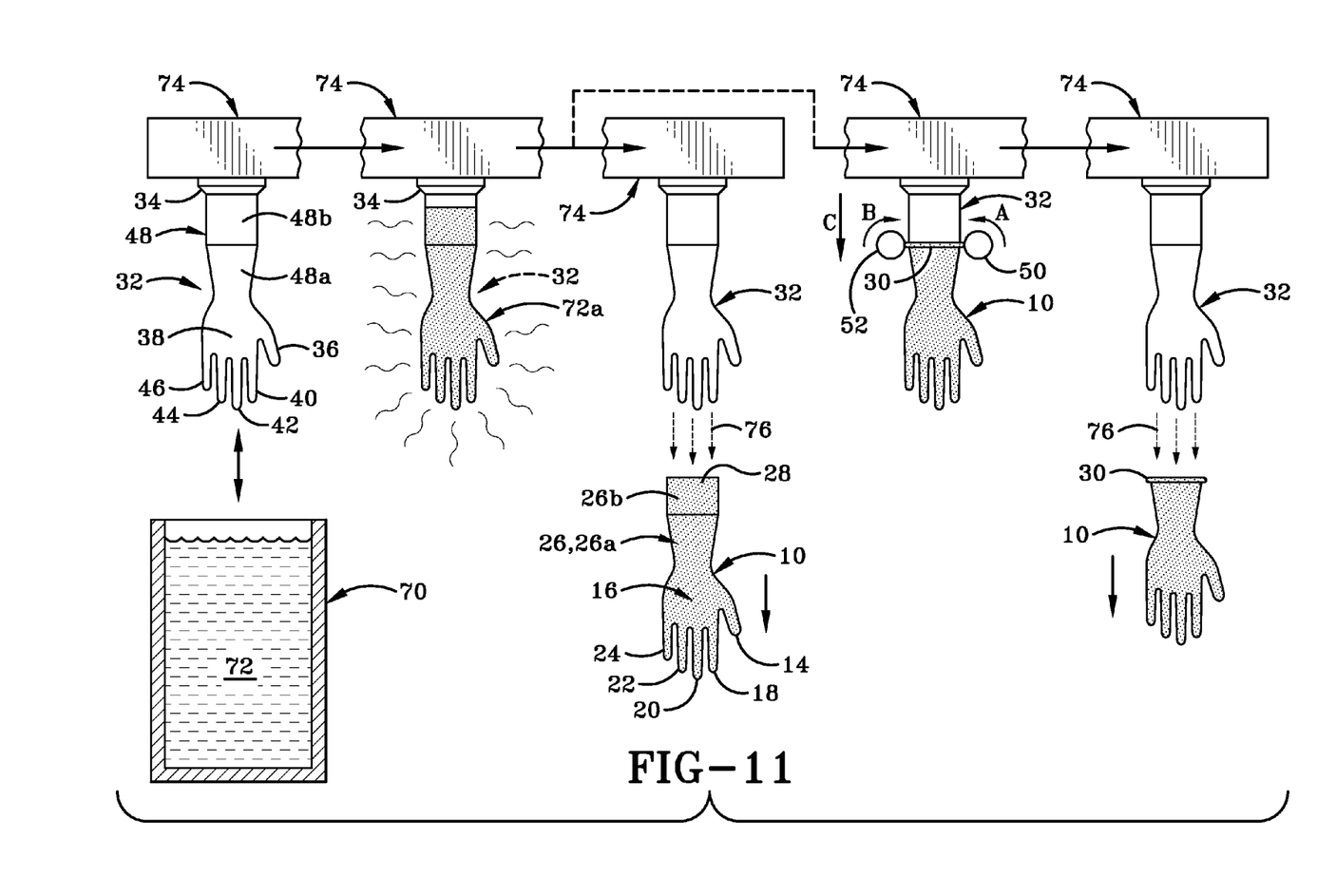
FIG. 11 is an illustrative drawing of a method of manufacturing a glove in accordance with aspects of the invention.

Referring now to FIG. 11, a method of fabricating a glove comprises:
providing a former 32 that includes a palm 38, a thumb 36 and four digit regions 40, 42, 44, 46 extending outwardly from palm 38 in a first direction, and a wrist 48 that extends outwardly from palm 38 in a second direction; and wherein wrist 48 includes a first region 48 that gradually increases in width from palm 38 outwardly in the second direction, i.e., the first region 48a flares outwardly;
A. dipping former 32 into a vat 70 of liquid material 72, such as nitrile or latex;
B. removing former 32 from liquid material 72;
C. drying a quantity of liquid material 72a which remains on former 32 so as to form the glove 10;
D. removing glove 10 from former 32.

The step A. above of dipping former 32 may further include the step of engaging former 32 in a substantially continuous automated chain machine, a batch machine or a semi-batch machine. The selected one of the machines is represented in FIG. 11 by box 74. Former 32 is then dipped into the vat 70 which forms part of the selected machine 74.

The method may further include providing former 32 where the wrist 48 further includes a second section 48b which extends outwardly from the first section 48a; and wherein second section 48b is of a constant width and the constant width of second section 48b is of a size equal to a widest portion of the first section 48a.

Additionally, the step A. of dipping includes dipping former 32 into vat 70 of liquid material 72 to a depth that both of the first and second sections 48a, 48b of wrist 48 on of former 32 will extend into the liquid material 72. The step of providing the former may further include providing the former where the first section 48a is generally elliptical in cross-sectional shape; and the second section 48b is generally circular in cross-sectional shape.

The method may further include forming a bead 30 at an end of the glove 10. This is accomplished by passing former 32 between two opposed rollers 50, 52 which rotate in opposite directions "A" and "B" relative to each other. Rollers 50, 52 or former 32 are moved in a direction "C" that will cause the rollers 50, 52 to ride along a length of second section 48b of former 32. This means that the rollers move from a region of the second section 48b that is free of drying liquid material 72a to a section that includes a quantity of drying liquid material 72a. Rollers 50, 52 move along the section that includes the quantity of drying liquid material 72a to cause that drying liquid material to roll into the bead 30 which extends around a circumference of the former 32 and of glove 10. Finally, the method includes blowing a puff of air 76 into glove 10 while on former 32 in order to remove glove 10 from former 32.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. A former for fabricating a glove, wherein the former comprises:
a base;
a wrist extending outwardly from the base;
a palm extending outwardly from the wrist;
a digit region extending outwardly from the palm and remote from the wrist; wherein the wrist includes a first region and a second region; wherein the first region extends downwardly from the palm and the second region is located between the first region and the base; and wherein the first region is generally elliptical in cross-sectional shape; and the second region is generally circular in cross sectional shape.

2. The former as defined in claim 1, wherein the first region of the wrist is positioned adjacent the palm; and the second region of the wrist is positioned between the first region and the base.

3. The former as defined in claim 1, wherein the first region is located proximate the palm and is of a first length.

4. The former as defined in claim 3, wherein the second region is located proximate the base and is of a second length.

5. The former as defined in claim 4, wherein the first region gradually increases in width along the first length, with a smallest width being provided proximate the palm and a largest width being provided remote from the palm.

6. The former as defined in claim 5, wherein the second region is of a substantially constant width along the second length.

7. The former as defined in claim 6, wherein the width of the second region is substantially equal to the largest width of the first region.

8. The former as defined in claim 1, wherein the digit region includes an index finger, a middle finger, a ring finger, and a little finger; and wherein the thumb and index, middle, ring and little fingers are all aligned along a common axis.

9. The former as defined in claim 1, wherein the digit region includes an index finger, a middle finger, a ring finger, and a little finger; and wherein the index, middle, ring and little fingers are all aligned along a common axis and the thumb is offset relative to that common axis.

10. The former as defined in claim 1, wherein the base is adapted to be engaged in a substantially continuous automated chain machine or in a batch machine or a semi-batch machine.

11. A method of fabricating a glove comprising:
providing a former that includes a palm, a thumb and four digit regions extending outwardly from an upper end of the palm, and a wrist that extends outwardly from a lower end of the palm; and wherein the wrist includes a first region that gradually increases in circumference moving outwardly away from the lower end of the palm;

and the wrist further includes a second region that extends outwardly from a lower end of the first region that is remote from the palm; and wherein the first region is generally elliptical in cross-sectional shape; and the second region is generally circular in cross-sectional shape;
dipping the former into a vat of liquid material;
removing the former from the liquid material;
drying a quantity of liquid material which remains on the former so as to form the glove; and
removing the glove from the former.

12. The method as defined in claim 11, further comprising the step of engaging the former in a substantially continuous automated chain machine, a batch machine or a semi-batch machine prior to dipping the former into the vat.

13. The method as defined in claim 11, wherein the second region is of a substantially constant width and the width of the second region is of a size equal to a widest portion of the first region.

14. The method as defined in claim 13, wherein the step of dipping includes dipping the former into the vat of liquid material to a depth that both of the first and second regions of the wrist on of the former will extend into the liquid material.

15. The method as defined in claim 11, further comprising the step of forming a bead at an end of the glove.

16. The method as defined in claim 15, wherein the step of forming the bead includes passing the former between two opposed rollers which rotate in opposite directions to each other.

17. The method as defined in claim 16, further comprising the step of moving the rollers or moving the former in a direction that will cause the rollers to ride along a length of the second region of the former.

18. The method as defined in claim 17, further comprising the step of moving the rollers from a section of the second region that is free of drying liquid material to a section that includes a quantity of drying liquid material.

19. The method as defined in claim 18, further comprising the step of moving the rollers along the section that includes the quantity of drying liquid material to cause that drying liquid material to roll into a bead which extends around a circumference of the former.

20. The method as defined in claim 19, further comprising the step of blowing air into the glove on the former in order to remove the glove from the former.

* * * * *